(12) United States Patent
Gray et al.

(10) Patent No.: US 11,283,533 B1
(45) Date of Patent: Mar. 22, 2022

(54) SYSTEMS AND METHODS FOR DETECTING AND CONNECTING TO A DEVICE IN A VEHICLE

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Qunying Kou, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 163 days.

(21) Appl. No.: 16/810,562

(22) Filed: Mar. 5, 2020

Related U.S. Application Data

(60) Provisional application No. 62/815,729, filed on Mar. 8, 2019.

(51) Int. Cl.
*H04B 17/318* (2015.01)
*H04W 4/80* (2018.01)
(Continued)

(52) U.S. Cl.
CPC ......... *H04B 17/318* (2015.01); *H04B 17/373* (2015.01); *H04W 4/029* (2018.02); *H04W 4/80* (2018.02)

(58) Field of Classification Search
CPC ... H04B 17/318; H04B 17/373; H04W 4/029; H04W 4/80
See application file for complete search history.

(56) References Cited

U.S. PATENT DOCUMENTS

| | | | | |
|---|---|---|---|---|
| 2015/0197205 | A1* | 7/2015 | Xiong | B60R 16/037 701/49 |
| 2015/0210287 | A1* | 7/2015 | Penilla | G06F 3/04842 701/49 |

(Continued)

*Primary Examiner* — Duc C Ho
(74) *Attorney, Agent, or Firm* — Fletcher Yoder, P.C.

(57) ABSTRACT

A user interface system may include a processor. The processor may perform operations including receiving a wireless signal from multiple wireless devices. The operations may also include determining a signal strength of each wireless signal from each of the multiple wireless devices based on a first set of properties associated with a respective wireless signal. Moreover, the operations may include determining a signal vector of each wireless signal from each of the multiple wireless devices based on a second set of properties associated with the respective wireless signal. Additionally, the operations may include determining a location for each of the multiple wireless devices based on the signal strength and the signal vector. Further, the operations may include pairing one of the multiple wireless devices to the user interface system based on the location for each of the plurality of wireless devices.

20 Claims, 4 Drawing Sheets

(51) Int. Cl.
*H04W 4/029* (2018.01)
*H04B 17/373* (2015.01)

(56) References Cited

U.S. PATENT DOCUMENTS

2018/0059913 A1* 3/2018 Penilla .................. B60W 40/08
2019/0361694 A1* 11/2019 Gordon ................. G06F 1/1673
2020/0216077 A1* 7/2020 Nolscher ............... H04W 76/14

* cited by examiner

SYSTEMS AND METHODS FOR DETECTING AND CONNECTING TO A DEVICE IN A VEHICLE

CROSS-REFERENCE TO RELATED APPLICATION

The present disclosure is related to, and claims priority to, U.S. Provisional Patent Application Ser. No. 62/815,729, titled "Systems and Methods for Detecting and Connecting to a Device in a Vehicle," which was filed on Mar. 8, 2019, and which is herein incorporated by reference in its entirety for all purposes.

BACKGROUND

The present disclosure relates generally to detecting and connecting a device to a user interface system of a vehicle. More specifically, the present disclosure relates to detecting a particular device among multiple devices in a vehicle and connecting the particular device to the user interface system of the vehicle.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

With the growing trend of using wireless devices while driving a vehicle, manufacturers have updated vehicle systems to become compatible with a number of wireless devices. For example, vehicles may be equipped with a user interface system, such as an entertainment system, which may include a display and multiple applications including a radio application, a navigation application, a Wi-Fi hotspot application, etc. The user interface system may be controlled by a user (e.g., driver or passenger) via an input (e.g., touch or button) on the display or via an input on the user's wireless device. Often, the driver of the vehicle is accompanied by one or more passengers, and each may have one or more compatible wireless devices with them. Thus, there may be multiple devices within the vehicle, such that each of the devices may be able to connect to the user interface system. As such, improved systems and methods for efficiently and effectively detecting a particular device to connect to the user interface system may be beneficial.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a user interface system may include a processor. The processor may perform operations including receiving a wireless signal from multiple wireless devices. The operations may also include determining a signal strength of each wireless signal from each of the multiple wireless devices based on a first set of properties associated with a respective wireless signal. Moreover, the operations may include determining a signal vector of each wireless signal from each of the multiple wireless devices based on a second set of properties associated with the respective wireless signal. Additionally, the operations may include determining a location for each of the multiple wireless devices based on the signal strength and the signal vector. Further, the operations may include pairing one of the multiple wireless devices to the user interface system based on the location for each of the plurality of wireless devices.

In one embodiment, a method for detecting and connecting to a wireless device of multiple wireless devices, may include detecting, via a processor, the multiple wireless devices in a vehicle. Moreover, the method may include determining, via the processor, a respective location of each of the multiple wireless devices within the vehicle. Furthermore, the method may include pairing, via the processor, with a first wireless device of the plurality of wireless devices based on the respective location of each of the plurality of wireless devices and a predefined setting of a user interface system of the vehicle.

In one embodiment, a tangible, non-transitory, machine-readable medium, may include machine-readable instructions that, when executed by one or more processors, cause the one or more processors to perform operations. The operations may include sending a signal to multiple wireless devices requesting each of the multiple wireless devices to send a respective first signal representative of a location of a respective wireless device within a vehicle. Moreover, the operations may include receiving the respective first signal from each of the multiple wireless devices. Additionally, the operations may include determining a respective location for each of the multiple wireless devices based on the first signal within the vehicle. Furthermore, the operations may include pairing one of the multiple wireless devices to the user interface system of the vehicle based on the respective location for each of the multiple wireless devices.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
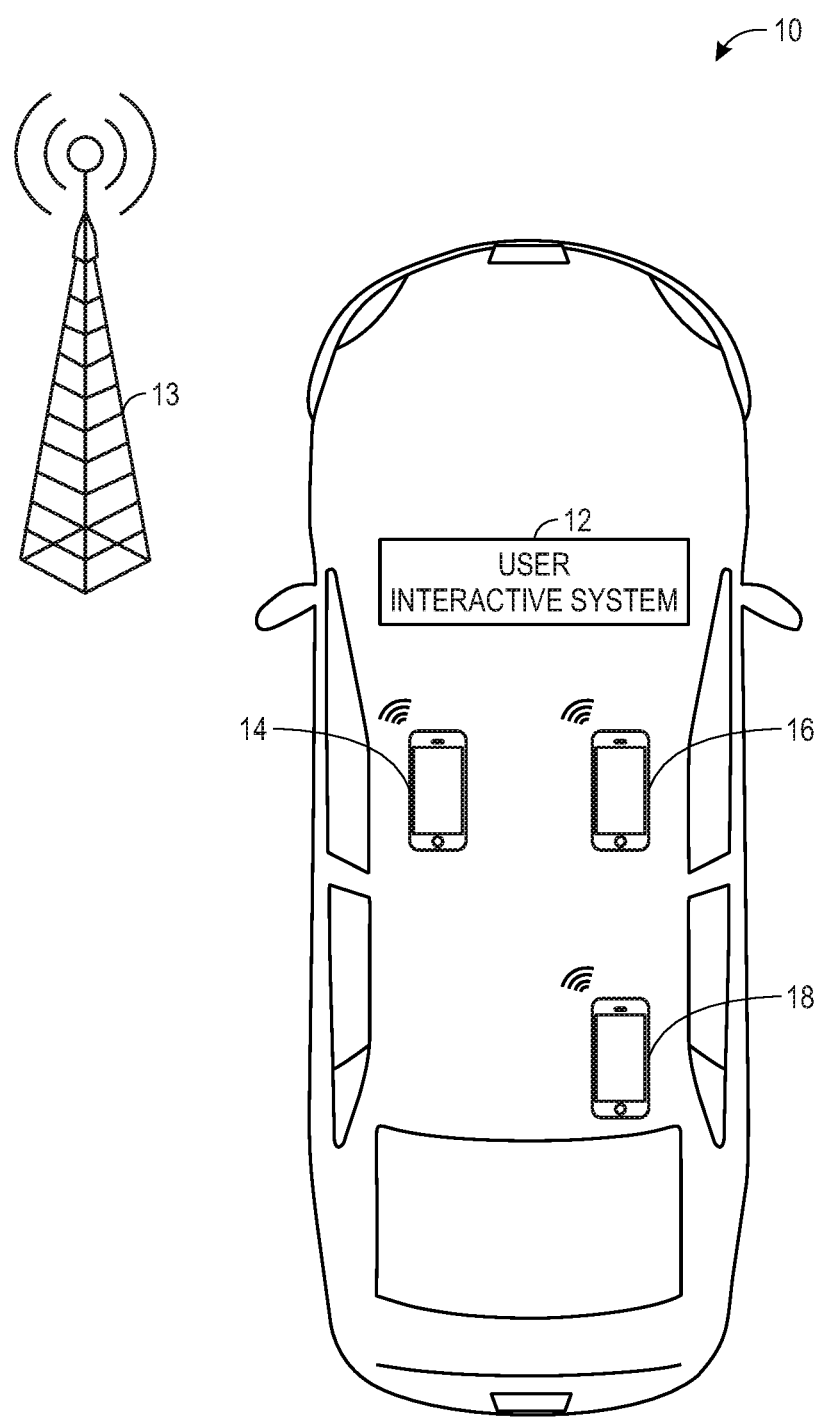
FIG. 1 illustrates a block diagram of a vehicle with a user interface system that may benefit from detecting and connecting to a particular wireless device in the vehicle, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, individuals are increasingly using wireless devices in their vehicles while commuting to their destinations. As such, vehicles are often equipped with a user interface system that may pair to the individual's wireless device. The user interface system may include a display and various entertainment features, such as a music application (e.g., radio), a navigation application, a smartphone application, a Wi-Fi or Hotspot application, and the like. Upon pairing, the wireless device may be used to control the applications of the user interface system instead of manual user inputs on the display of the user interface system. Thus, control and use of the application via the paired wireless device may be displayed on the display by mirroring the display of the wireless device.

However, multiple wireless devices may be present in the vehicle, such that each of the multiple wireless devices are capable of pairing to the user interface system. To prevent multiple wireless devices from connecting to the user interface system to control the entertainment applications or to enable a particular wireless device to connect to the user interface system, the presently disclosed embodiments detail certain systems and methods for determining a particular wireless device from the multiple wireless devices and connecting the particular wireless device to the user interface system. Moreover, in some embodiments, a first wireless device may be determined and connected to the user interface system to control a first application, such as the music application of the user interface system, while a second wireless device may be determined and connected to the user interface system to control a second application, such as the navigation application. Additional details with regard to controlling the connection between multiple wireless devices and the user interface system of a vehicle will be discussed below with reference to FIGS. 1-6.

With the foregoing in mind, FIG. 1 illustrates a block diagram of a vehicle 10 that may use a user interface (UI) system 12 to detect and connect to one or more particular wireless devices of multiple wireless devices. As shown in FIG. 1, multiple wireless devices 20 may be inside the vehicle 10, including a first wireless device 14, a second wireless device 16, and a third wireless device 18. Although the multiple wireless devices 20 (e.g., first wireless device 14, second wireless device 16, and third wireless device 18) are portable phones in the depicted embodiment, which represents a particular embodiment, the multiple wireless devices 20 may be any such device that may pair to other devices or systems wirelessly or without the use of a cable. For example, the multiple wireless devices 20 may be portable phones, tablets, laptops, headphones, and the like. The multiple wireless devices 20 may include circuitry and entertainment applications to make them compatible with the user interface system 12, such as to allow pairing to facilitate controlling the entertainment applications of the user and/or displaying the controlled applications onto the display of the user interface system 12. In some embodiments, the multiple wireless devices 20 may be capable of receiving and transmitting wireless signals and messages over cellular towers 13, satellites, or other suitable telecommunication mediums. The wireless signals may be used to pair with other wireless devices within the vehicle and/or the user interface system 12.

Figure 2:
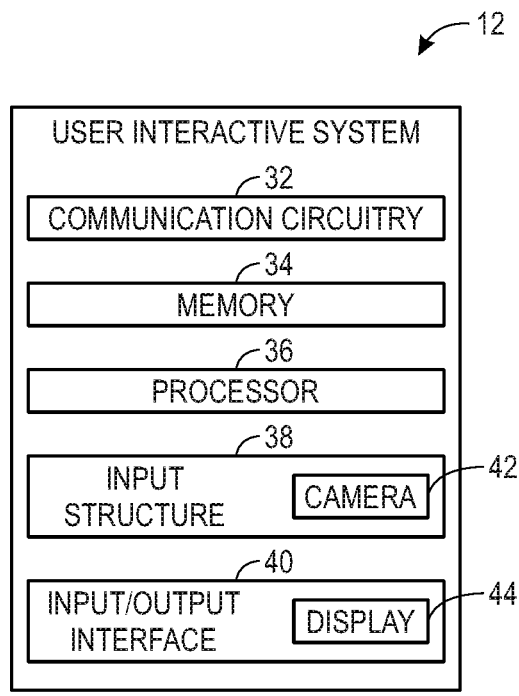
FIG. 2 illustrates a block diagram of the vehicle user interface system employed by the vehicle of FIG. 1, in accordance with embodiments described herein.

To detail the user interface system 12, FIG. 2 illustrates the user interface system 12 employed by a vehicle 10 that includes certain components, electronic devices, and a collection of electronic devices that enable the vehicle user interface system 12 to perform the methods described herein. As shown in FIG. 2, the user interface system 12 may include communication circuitry 32, a memory 34, a processor 36, input structures 38, an input/output (I/O) interface 40, a camera 42, and a display 44. It should be understood that the illustrated system is merely intended to be exemplary, and that certain features and components may be omitted and various other features and components may be added to facilitate performance, in accordance with the disclosed embodiments. Moreover, it should be noted that although examples provided herein may explicitly depict and describe pairing a particular wireless device among multiple wireless devices 20 to the user interface system 12 within a vehicle 10, the approaches disclosed may be used to determine a particular device among multiple wireless devices 20 in a non-vehicular context. For example, the techniques described herein may be used for determining and pairing the particular device to another wireless device or a wireless entertainment system that may be stationary within a room, such as for pairing to a wireless television, a wireless home sound system, and the like.

With the foregoing in mind, the communication circuitry 32 may enable the user interface system 12 to communicate and interface with the multiple wireless devices 20. For example, the communication circuitry 32 may transmit and receive wireless signals (e.g., radio signals, sound signals, and image data signals) to and from the multiple wireless devices 20 that are within a specific distance, such as a distance encompassing the vehicle 10. Upon determining the particular wireless device using the techniques described herein, the communication circuitry 32 may allow pairing to the particular wireless device to the user interface system 12. Pairing may include communicating a message to the particular wireless device to enable pairing, such as a prompt on a display of the particular wireless device. In some embodiments, the communication circuitry 32 may also allow the user interface system 12 to communicatively couple to a network. Such networks may include public networks such as the internet, private networks such as an institutional or personal intranet, or any combination of private and public networks. The networks may include any suitable type wireless network, including but not limited to local area networks (LANs), wide area networks (WANs), wireless WANs (WWANs), wireless LANs (WLANs), mobile communications networks (e.g., 3G, 4G, 5G, LTE, Edge, etc.), mobile hotspots to connect to the mobile communication networks, and so forth. Moreover, after the user interface system 12 is connected to a network, it may provide the multiple wireless devices 20 a connection to the same network via the communication circuitry 32. By way of example, the particular wireless device may connect to a 3G network using the mobile hotspot of the user interface system 12. In this manner, the particular wireless device may access application features, such as music playlist of a music application of the user interface system's 12 and/or the particular wireless device that may be otherwise unavailable offline.

In some embodiments, the memory 34 may store instructions, data, and/or information, such as an algorithm used for detecting and determining one or more particular wireless devices among multiple wireless devices 20 and using the determined devices to pair to the user interface system 12. Additionally or alternatively, the algorithm may be used to pair the particular wireless device to control a particular application while pairing a different particular device to control a different particular application of the user interface system 12. The memory 34 may be a tangible, non-transitory, computer-readable medium that stores instructions executable by and received wireless signal data to be processed by the processor 36. Thus, in some embodiments, the memory 34 may include random access memory (RAM), read only memory (ROM), rewritable non-volatile memory, flash memory, hard drives, optical discs, and the like. In addition, in some embodiments, the processor 36 may be one or more general purpose microprocessors, one or more application specific processors (ASICs), one or more field programmable logic arrays (FPGAs), or any combination thereof.

As discussed in more detail below, the processor 36 may receive wireless signals (e.g., radio signals) from the multiple wireless devices 20. The processor 36 may process instructions stored in memory 34 to determine the relative location of the multiple wireless devices 20 using the received wireless signals using the techniques described herein. Based on the relative location of the multiple wireless devices 20, a particular wireless device among the multiple wireless devices 20 may be paired to the user interface system 12 to control applications (e.g., control the vehicle's music application of the user interface system 12 by playing a playlist on the paired particular wireless device) via the input structures 38 and input/output interface 40. In some embodiments, more than one particular device may be detected to control different applications of the user interface system 12.

The input structures 38, in combination with the input/output interface 40, may allow a user to control the user interface system 12. For example, the input structures 38 may include buttons that allow activation or deactivation of the user interface system 12, navigation on the input/output interface 40, and/or activate a voice-recognition feature of the user interface system 12. Other input structures 38 may provide volume control or toggling between application selections (e.g., music queue of a playlist of the paired particular wireless device). The input structures 38 may also include a microphone that may obtain a user's voice for various voice-related features, such as to allow control of certain application features (e.g., hands-free control after pairing to a particular wireless device) of the user interface system 12. Additionally, the input structures 38 may include a camera 42 or image sensor, which may be used to gather an image of the interior and/or exterior of the vehicle 10, such as for determining location of multiple wireless devices 20 in the vehicle 10. In some embodiments, the input structures 38 may couple to other peripheral components such as input devices (e.g., devices connected using a USB port), sensors, input/output (I/O) modules, and the like. The vehicle 10 may include a USB port that may be used in conjunction with a compatible USB cable to connect a device to the user interface system 12. In this manner, the device may be paired automatically to the user interface system 12 upon connecting to the USB port rather than pairing wirelessly. In some embodiments, the user interface system 12 may be set to prefer pairing with a device that is connected via a cable over a device that is connected via wireless pairing.

The input/output (I/O) interface 40 may include a display 44, which may enable the user interface system 12 to interface with other electronic devices and may operate to depict visualizations associated with software or executable code being processed by the processor 36. In one embodiment, the display 44 may function as part of a control interface for the user interface system 12. The display 44 may be capable of receiving touch inputs (e.g., selecting an application of the user interface system 12 to control) from a user in the vehicle 10. The display 44 may be any suitable type of display, such as a liquid crystal display (LCD), plasma display, or an organic light emitting diode (OLED) display, for example. Further, in other embodiments, the particular wireless device may mirror its user interface or display onto display 44, such as by using the smartphone application. For example, after the particular device of the multiple wireless devices 20 is paired with the user interface system 12, the user interface system 12 may mirror compatible applications from the particular wireless device to the display 44. Compatible applications may include, but are not limited to, global positioning system (GPS) navigation, music playback, short message service (SMS), telephone, web search, etc.

Figure 3:
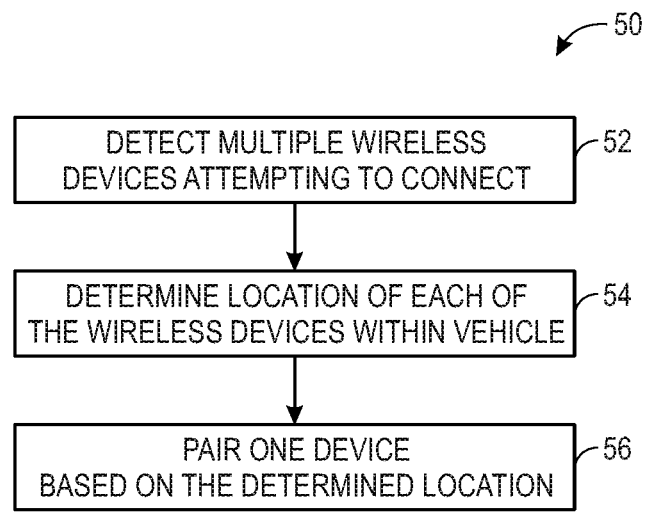
FIG. 3 illustrates a flow chart of a method for determining and connecting a particular wireless device to the user interface system of FIG. 2, in accordance with embodiments described herein.

Turning to a discussion of the process for determining a particular wireless device from multiple wireless devices 20, FIG. 3 illustrates a flow chart of a method 50 for detecting and connecting a particular wireless device among multiple wireless devices 20 to the user interface system 12. It should be noted that although the method 50 is described below in a particular order, it should be understood that the method 50 may be performed in any suitable order.

As previously discussed, there may be multiple wireless devices 20 in a vehicle 10, such that each of the multiple wireless devices 20 are equipped with components and circuitry that allow them to pair with and control the user interface system 12. In some embodiments, the user interface system 12 may detect (block 52) that there are multiple wireless devices 20 in the vehicle that are attempting to connect to the user interface system 12. For example, the detection may be based on the multiple wireless devices 20 including the capability to connect wirelessly to the user interface system 12, such as by Bluetooth, Wi-Fi, etc. The multiple wireless devices 20 may automatically default to attempting to connect with other wireless devices, such as the user interface system 12, which includes similar capabilities for a wireless connection (e.g., a compatible wireless communication interface of Bluetooth, Wi-Fi, etc.), by transmitting signals that cause the respective wireless devices to communicate with or pair with the user interface system 12. Thus, the user interface system 12 may receive an indication of each of the multiple wireless devices 20 that are in the vehicle 10 and are capable of connecting to its system.

After detecting the multiple wireless devices 20, the user interface system 12 may determine (block 54) a location of each of the multiple wireless devices 20 within the vehicle 10, such as the first wireless device 14 of FIG. 1. In this manner, the user interface system 12 may connect to the particular device based on the identified location (e.g., driver seat area for the first wireless device 14) and predefined settings of the user interface system 12 for its one or more applications. For example, the user interface system 12 may be set to prefer pairing with a wireless device located proximate to the driver seat. Additional details with regard to the process undertaken by the user interface system 12 to determine the location of each of the multiple wireless devices 20 will be discussed below with reference to FIGS. 4-5.

Additionally, after the location of each of the multiple wireless devices 20 is determined using the techniques described, the method 50 of detecting and connecting a particular wireless device among multiple wireless devices 20 to the user interface system 12 may include pairing (block 56) one device based on the determined location. The user interface system 12 may pair with the preferred particular device based on its predefined settings for pairing. In some embodiments, the pairing may be based on safety settings. By way of example, the user interface system 12 may be set to pair to the particular device (e.g., first wireless device 14) located at the driver's seat when the vehicle 10 is stationary and pair to a device located at the passenger's seat (e.g., second wireless device 16) when the vehicle is mobile.

In some implementations, a driver may want to pair their wireless device to the user interface system 12 to control specific applications that may not affect the safety of riders when the vehicle 10 is mobile (e.g., moving). Additional details with regard to the process undertaken by the user interface system 12 to pair based on the application type being executed on each of the multiple wireless devices 20 will be discussed below with reference to FIG. 6.

Figure 4:
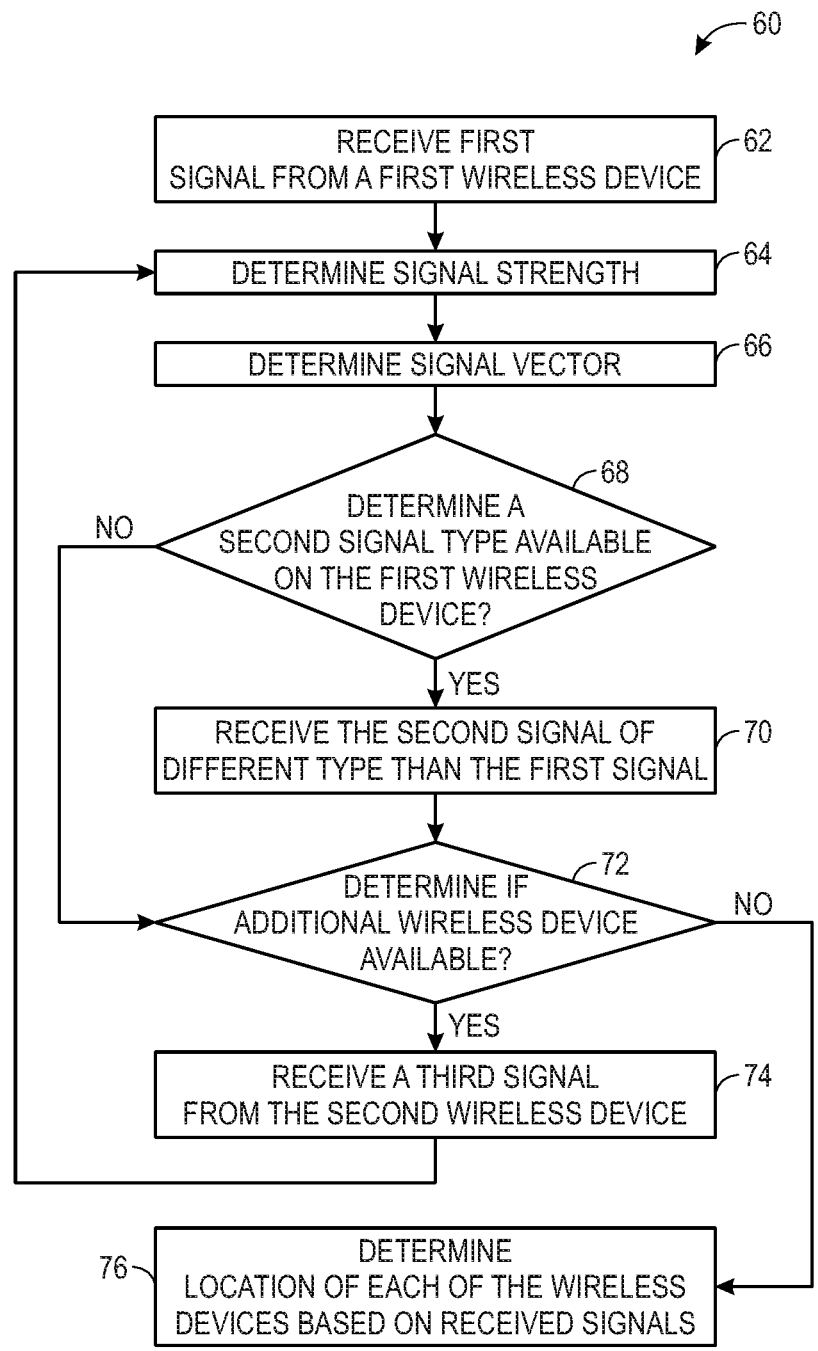
FIG. 4 illustrates a flow chart of a method for determining the particular wireless device among multiple wireless devices by using signal strength of received signals, in accordance with embodiments described herein.

In some implementations, radio signals may be transmitted by each of the multiple wireless devices 20 and received by the user interface system 12 for the determining location of each of the devices. To detail, FIG. 4 illustrates a flow chart for a method 60 for determining the particular wireless device among the multiple wireless devices 20 by using signal strength of detect signals in vehicle 10. By way of example, the particular wireless device pertinent to the following discussion may be the first wireless device 14 of FIG. 1. The user interface system 12 may receive (block 62) a first signal (e.g., radio signals, sound signals, and image data signals) from the first wireless device 14. The first signal may be a radio signal. The radio signal may be characterized using various measurement standards, including but not limited to, Received Signal Strength Indicator (RSSI), Reference Signal Received Power (RSRP), Reference Signal Received Quality (RSRQ), Signal to Interference plus Noise Ratio (SINR), etc. In the one embodiment, the signals transmitted by the multiple wireless devices 20 may be characterized by RSSI, which measures the power present in a received radio signal at the wireless device. The RSSI value is expressed in decibels (dB) with reference to one milliwatt (mW), decibel-milliwatts (dBm), and relates the signal strength of the cellular signal from the tower to device. Generally, acceptable signal strength range includes −70 dBm to −30 dBm, and the signal is stronger as it approaches closer to 0. The signal strength power may degrade due to environmental factors, such as weather, physical barriers (e.g., buildings, trains, etc.), proximity to cellular tower or hotspot, competing signals, etc.

After receiving the first signal from the first wireless device 14, the user interface system 12 may determine (block 64) signal strength based on properties (e.g., amplitude, delay) of the received first signal. For example, the strength of the signal transmitted from the first wireless device 14 may be measured as an RSSI value. The user interface system 12 may be set (e.g., manufactured or controlled by a user) to pair with signal strength within a threshold or range (e.g., −60 to −85 dBm). By way of example, the user interface system 12 may pair the first wireless device 14 when it is transmitting signals at −60 dBm but may not pair with the first wireless device 14 when it is transmitting signals at −90 dBm.

Additionally, the user interface system 12 may determine (block 66) a signal vector. Determining the signal vector may include determining the angle magnitude of the signal, a phase of the signal, and/or an angle of the signal and/or the transmitting device relative to the user interface system 12. In some embodiments, angle of arrival (AoA) measurements may be used to determine the direction and propagation of signal. For example, the AoA measurements may measure the radio-frequency (RF) wave incident on an antenna array or determined from maximum signal strength during antenna rotation. AoA measurements determine direction of the signal by measuring the time difference of arrival (TDOA) at individual elements of the array. Thus, AoA measurements may indicate the direction from which signals are transmitted, such as from the first wireless device 14. Moreover, the AoA measurements and/or the magnitude and phase measurements may indicate an elevation angle.

Based on the signal vector measurements, the user interface system 12 may generate a three-dimensional (3D) map (e.g., XYZ coordinates on a map) for the signal. As a point of reference, the map may be generated from the viewpoint of the user interface system 12 that is positioned on a dashboard of the vehicle 10 and facing towards the backseat of the vehicle 10. Thus, the user interface system 12 may serve as the center (e.g., origin) of the 3D map and the signals transmitted from devices may be calculated to have an X coordinate (e.g., left side and right side of vehicle), Y coordinate (e.g., dashboard up to trunk of vehicle 10), and Z coordinate (e.g., floor up to roof of vehicle 10). Since the calculations may consider vehicle 10 space from the user interface system 12 position on the dashboard up to back of the vehicle 10, the 3D map may not generate or consider signals having coordinates that place such signals outside the vehicle 10. By way of example, determining the signal vector may indicate that the first signal from the first wireless device 14 may be at an angle of 45 degrees with an elevation of 1 ft. Thus, this signal vector may indicate that the first signal is transmitted from a device on the right side and seat level elevation of the vehicle 10. However, if the signal vector calculated resulted in a −3 ft. elevation, the calculation may indicate that the first wireless device 14 transmitting the first signal is located on the floor of the vehicle 10. In this manner, the user interface system 12 may determine a strength and an angle of a signal, and use these determinations to consider or disregard the signal based on predefined settings (e.g., set by a manufacturer or a user).

Often, wireless devices, including the first wireless device 14, may be capable of connecting or pairing with other devices via various communication signals. For example, the first wireless device 14 may communicate with other devices using cellular, Bluetooth, and/or Wi-Fi signals. The user interface system 12 may also determine (block 68) if another or second signal type is available on the first wireless device 14. Thus, if the user interface system 12 detects that the first wireless device 14 is capable and transmitting another type of signal, such as Bluetooth, the user interface system 12 may characterize the second signal type similar to the characterization of the first signal type, as described above with respect to blocks 64-66 of FIG. 4.

Upon determining that another signal type is available on the first wireless device 14, the user interface system 12 may then continue to receive (block 70) the second signal type that is different than the first signal type. For example, in the current embodiment, the first signal is a cellular signal and the second signal is a Bluetooth signal. Thus, the two signal types are different. The different signal types may be determined based on if the signals are transmitted over a network carrier and/or the particular frequency band used for the transmission of the signals.

On the other hand, if the second signal type is determined to be unavailable at block 68, or if the second signal type is determined and received at block 70, then the user interface system 12 may determine (decision block 72) if an additional wireless device (e.g., second wireless device 16) is available. Thus, the user interface system 12 may detect and determine multiple wireless devices 20 within the vehicle 10. In response to detecting and determining the second wireless device 16, such as by the second wireless device 16 transmitting wireless signals, the user interface system 12 may receive (block 74) a third signal from the second wireless device 16. Similar to the other signals received, the user interface system 12 may characterize the third signal for pairing using the techniques previously described, such as by returning to determining (block 64) signal strength, etc. These steps may be repeated for additional devices of the multiple wireless devices 20 that are detected and transmitting signals that may allow pairing to the user interface system 12.

However, at block 72, if an additional wireless device (e.g., second wireless device 16) is not available, then the user interface system 12 may determine (block 76) location of each of the wireless devices based on the received signals. For example, the signal strength and/or signal vector may be used to determine the location of the transmitting first wireless device 14. In some embodiments, the user interface system 12 may be predefined to prefer pairing with a device transmitting signals based on a predefined threshold for strength and/or proximity and/or preferred angle of the received signal type. By way of example, the user interface system 12 may be set to prefer pairing with a device located proximate to the driver's seat of the vehicle 10. Such a device may transmit a signal having a high power dBm, close proximity, an angle that is leveled with the user interface system 12, and may be a cellular signal. Referring back to the example of a first signal of the first wireless device 14 resulting in a signal vector calculation of 45 degrees with an elevation of 3 ft., the signal may indicate that the first wireless device 14 is located on a driver's seat. Thus, the user interface system 12 may pair with the first wireless device 14 upon determining the respective location of the first wireless device 14 and confirming that the preferred pairing indicates a hierarchy of preferred pairings with respect to locations within the vehicle 10.

However, depending on the mobility (e.g., mobile rather than stationary) of the vehicle 10, the user interface system 12 may be set to disregard devices proximate to the driver's seat and prefer a different device (e.g., next strongest signal strength for the particular signal type and/or next closest proximity), such as a wireless device proximate to the passenger seat of the vehicle 10. Such settings may be particularly useful for safety of riders in the vehicle 10. In some embodiments, even if the signal strength, type, and/or angle is within threshold to be detected and paired with the user interface system 12, the signal may be disregarded if it is below a particular elevation (e.g., wireless headphones that are transmitting Bluetooth signals but are located on the floor of vehicle 10).

Figure 5:
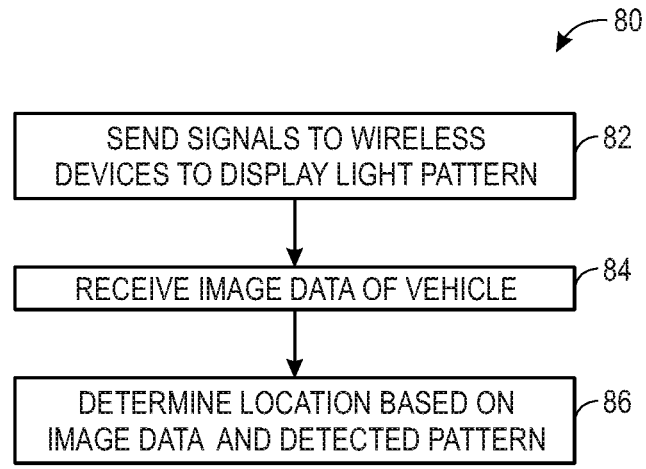
FIG. 5 illustrates a flow chart of a method for determining the particular wireless device among multiple wireless devices detected using image analysis, in accordance with embodiments described herein.

As previously mentioned, determining location of each of the multiple wireless devices 20 in the vehicle 10 may be determined using the received wireless signals. In some embodiments, the signal type may be a light pattern signal. To illustrate, FIG. 5 illustrates a flow chart for a method 80 for determining the particular wireless device (e.g., first wireless device 14 of FIG. 1), among the multiple wireless devices 20 in vehicle 10 by using image analysis. The method may include the user interface system 12 sending (block 82) signals to the multiple wireless devices 20 requesting that they each display a unique light pattern (e.g., light pattern from each device is different than the other). The request signals may be sent using a cellular, Bluetooth, and/or Wi-Fi connection.

In response to receiving the signal, each of the multiple wireless devices 20 may process the signal data and cause the respective device to output a respective unique light pattern. By way of example, the light pattern may include using a camera flash feature of its device to produce a flashing pattern. When the multiple wireless devices 20 start emitting the flashing light pattern, the camera 42 of the user interface system 12 may receive (block 84) image data (e.g., picture or video) of the vehicle 10, such that the image includes a picture of the vehicle and the multiple wireless devices 20 producing the light pattern.

Using the received image data, the user interface system 12 may determine (block 86) a location based on the image data having the detected patterns. The image data received may be used by the user interface system 12 to create a map of the vehicle 10 that indicates locations of the multiple wireless devices 20 emitting the light pattern. In particular, since the light pattern from each device or the multiple wireless devices 20 is unique, the user interface system 12 may use the particular light pattern to identify the location of each of the multiple wireless devices 20 corresponding to a light pattern. Additionally, the image data including the different light patterns may indicate that devices are the floor of the vehicle 10, which may be used by the user interface system 12 to disregard when making pairing determinations. Based on the image data, the user interface system 12 may determine devices of the multiple wireless devices 20 proximate to the driver's seat, passenger's seat, and other areas within the vehicle 10.

Additionally, the user interface system 12 may send a request to the multiple wireless devices 20 to output a sound signal in the same fashion as described above. As a result, each of the multiple wireless devices 20 may output a sound wave that may be detected by sensors on the user interface system 12. Devices that are more than some distance away from the user interface system 12 may send a sound wave that has a lower amplitude of volume due to the distance. The received sound wave may be used to determine and/or disregard the respective device for pairing. That is, the user interface system 12 may receive and process the sound signals from each of the multiple wireless devices 20 and determine a relative location of the multiple wireless devices 20 that sent the respective sound signal, such as by the strength or amplification of the tone.

Using signals (e.g., radio and/or sound signals) to determine a specific location of a device may be particularly useful when multiple vehicles 10 with user interface systems 12 are capable of pairing to the multiple wireless devices 20. For example, a vehicle 10 with a user interface system 12 may be directly behind another vehicle 10 with a user interface system 12 and both may include multiple wireless devices 20 capable of pairing with either respective user interface systems 12. However, using the signals to determine location of the wireless devices within the vehicle 10 may allow the respective user interface system 12 to disregard the multiple wireless devices in the other vehicle 10.

Figure 6:
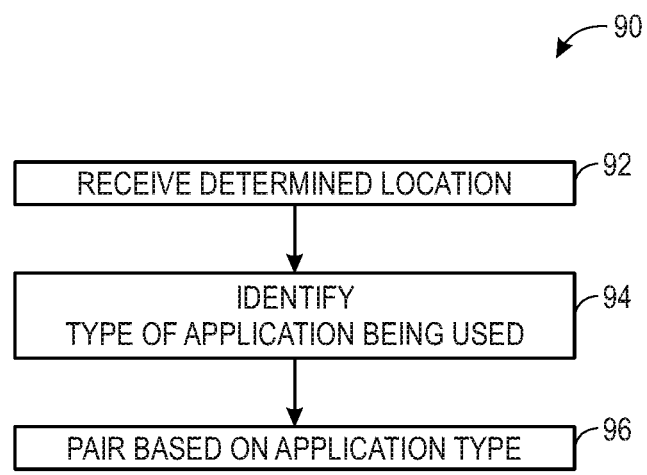
FIG. 6 illustrates a flow chart of a method for connecting the determined particular wireless device to the vehicle user interface system, in accordance with embodiments described herein.

As previously mentioned, in some implementations (e.g., safety taken into consideration for pairing), the user interface system 12 may determine an application type displayed on a device attempting to pair, so as to permit or deny pairing based on the particular application type. To illustrate, FIG. 6 depicts a flow chart for a method 90 for connecting the determined particular wireless device to the vehicle user interface system 12 based on determined location and an application type to be controlled by the particular wireless device. The user interface system 12 may receive (block 92) the determined locations of multiple wireless devices 20 in the vehicle 10 based on techniques described herein (e.g., radio signals and/or image analysis). After determining the locations of the multiple wireless devices 20, the user interface system 12 may send a request to pair to a particular wireless device or receive a request to pair from the particular wireless device. However, the request may also include an indication (e.g., embedded identification) of the type of application (e.g., GPS navigation, music playback, SMS, telephone, web search, etc.) that is currently being executed and/or receiving one or more inputs on the interactive application by the particular wireless device. For example, the particular wireless device requesting to be paired to the user interface system 12 may be executing and presently using a music application.

The user interface system 12 may identify (block 94) the type of application being used (e.g., displayed) on the particular wireless device requesting access or that may be executing on the particular wireless device when the user interface system 12 sends a request to pair. By way of example, and referring back to FIG. 1, the particular wireless device may be the first wireless device 14. The first wireless device 14 may have a music application in use while the second wireless device 16 may have a social media application in use. Thus, each of these application types may be identified and associated with their respective devices 14, 16 based on the data received from the respective devices. In some embodiments, the identification may also include identifying a device type (e.g., mobile telephone device, tablet device, etc.) associated with the request from the particular wireless device.

As previously discussed, the user interface system 12 may include a predefined list of pairing priorities and set a pairing with the first wireless device 14 based on a determined location proximate the driver's seat and the predefined list. The predefined list may include a list of applications that the respective wireless device 20 may be executing while the user interface system 12 is paired to the respective device. In particular, the predefined list may include multiple associations between multiple interactive applications and multiple permissions, in which the multiple permissions include an allowed status and a denied status for the multiple interactive applications. As such, after receiving or sending a request to pair with the first wireless device 14, the user interface system 12 may identify that an application is running on the first wireless device 14 and determine whether the identified application is on the predefined list. Accordingly, the user interface system 12 may pair (block 96) based on the identified application type. In particular, the user interface system 12 may allow or deny the request to pair and/or send a message indicating reason for allowing or denying pairing. In some embodiments, the user interface system 12 may disconnect the pairing of the first wireless device 14 if it switches to using an interactive application that is listed as an application in the predefined list that cannot be used while the user interface system 12 is paired with the first wireless device 14.

For example, the user interface system 12 may be set to deny or disconnect pairing to a particular device located at or proximate to the driver's that is running an interactive application type, such that the application type is one that the driver may likely view and interact with while mobile. For example, interactive applications may include, but not are not limited to, social media applications, media sharing applications, internet browser, and the like. Applications that are less interactive, such as applications running in the background of device, GPS, navigation, music applications, may be whitelisted in the predefined list, such that they are permitted to be used by the respective multiple wireless devices 20 while the multiple wireless devices 20 are paired with the user interface system 12.

Further, if the first wireless device 14 is identified as a non-interactive device type, such as a GPS navigation device that provides driving route guidance, the user interface system 12 may automatically allow pairing. In this manner, the user interface system 12 may consider the application and/or device type of the particular wireless device when pairing.

Moreover, since more than one device of the multiple wireless devices 20 may be determined for pairing using the techniques described herein, each of the multiple wireless devices 20 may be paired simultaneously to control different features or applications of the user interface system 12. Continuing with the example of the first wireless device 14 using a music application and the second wireless device 16 using a social media application, both of these devices 14, 16 may be paired to the user interface system 12. Since the first wireless device 14 is located in the driver's seat and uses a non-interactive application, the first wireless device 14 may pair to control the sound system of the user interface system 12. Similarly, and simultaneously, the second wireless device 16 may pair to the user interface system 12 even though it is using an interactive application. Since the second wireless device 16 is not located proximate to the driver's seat, and thus, is likely not associated with or accessible by the driver, the interactive application used on the second wireless device 16 may not affect the pairing permission.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to perform operations comprising:

receiving a wireless signal from each of a plurality of wireless devices;
determining a signal strength of each wireless signal from each of the plurality of wireless devices based on a first set of properties associated with a respective wireless signal;
determining a signal vector of each wireless signal from each of the plurality of wireless devices based on a second set of properties associated with the respective wireless signal;
determining a location for each of the plurality of wireless devices based on the signal strength and the signal vector; and
pairing one of the plurality of wireless devices to the system based on the location for each of the plurality of wireless devices.

2. The system of claim 1, wherein the processor is configured to perform the operations comprising pairing the one of the plurality of wireless devices in response to a respective location of the one of the plurality of wireless devices corresponding to a driver's seat of a vehicle.

3. The system of claim 1, wherein the processor is configured to perform the operations comprising:
receiving an indication of an application type being executed by the one of the plurality of wireless devices; and
disconnecting the one of the plurality of wireless devices based on the application type.

4. The system of claim 3, wherein the application type comprises an interactive application configured to receive one or more inputs while the interactive application is being executed.

5. The system of claim 1, wherein the wireless signal comprises a radio signal, a sound signal, an image data signal, or a combination thereof.

6. The system of claim 1, wherein the signal strength comprises a Received Signal Strength Indicator (RSSI) value.

7. The system of claim 1, wherein the signal vector comprises an angle magnitude of the wireless signal, a phase of the wireless signal, an angle of the wireless signal, or a combination thereof.

8. The system of claim 1, wherein the processor is configured to disconnect the one of the plurality of wireless devices in response to the signal vector indicating that an elevation of the one of the plurality of wireless devices is below a threshold.

9. A method for detecting and connecting to a wireless device of a plurality of wireless devices, comprising:
detecting, via a processor, the plurality of wireless devices in a vehicle;
determining, via the processor, a respective location of each of the plurality of wireless devices within the vehicle; and
pairing, via the processor, with a first wireless device of the plurality of wireless devices based on the respective location of each of the plurality of wireless devices and a predefined setting of a user interface system of the vehicle.

10. The method of claim 9, comprising:
identifying an interactive application displayed on the first wireless device, a device type of the first wireless device, or a combination thereof; and
pairing with the first wireless device based on the identified interactive application, the device type, or the combination thereof.

11. The method of claim 10, wherein the identified interactive application for the device type is part of a predefined list indicating pairing priorities.

12. The method of claim 11, wherein the predefined list comprises a plurality of associations between a plurality of interactive applications and a plurality of permissions, wherein the plurality of permissions comprises an allowed status and a denied status.

13. The method of claim 11, wherein the user interface system automatically switches to pairing with a second wireless device of the plurality of wireless devices in response to the first wireless device using one of a plurality of interactive applications part of the predefined list.

14. The method of claim 10, wherein the predefined setting of the user interface system comprises pairing with signals having a signal strength within a threshold range.

15. The method of claim 10, wherein the interactive application comprises a social media application, an internet browser application, a global positioning system (GPS) navigation application, a music playback application, a short message service (SMS) application, a telephone application, or a combination thereof, that receives input while the vehicle is moving.

16. The method of claim 9, wherein the plurality of wireless devices comprises a Bluetooth component, a Wi-Fi component, or a combination thereof, interface to allow pairing to the user interface system, each other, or a combination thereof.

17. A tangible, non-transitory, machine-readable medium, comprising machine-readable instructions that, when executed by one or more processors, cause the one or more processors to perform operations comprising:
sending a signal to a plurality of wireless devices requesting each of the plurality of wireless devices to send a respective first signal representative of a location of a respective wireless device within a vehicle;
receiving the respective first signal from each of a plurality of wireless devices;
determining a respective location for each of the plurality of wireless devices based on the respective first signal within the vehicle; and
pairing to one of the plurality of wireless devices based on the respective location for each of the plurality of wireless devices.

18. The tangible, non-transitory, machine-readable medium of claim 17, wherein the respective first signal comprises image data, a light pattern signal, a sound signal, or a combination thereof, from each of the plurality of wireless devices.

19. The tangible, non-transitory, machine-readable medium of claim 18, wherein the image data is captured via a camera device of the vehicle.

20. The tangible, non-transitory, machine-readable medium of claim 17, wherein the machine-readable instructions cause the one or more processors to perform the operations comprising generating a map of the vehicle that indicates the respective location of each of the plurality of wireless devices based on the respective first signals.

* * * * *